US011403624B2

United States Patent
Ravi

(10) Patent No.: US 11,403,624 B2
(45) Date of Patent: Aug. 2, 2022

(54) SYSTEM AND METHOD FOR LAYERED AUTHORIZATION TO MANAGE A PAYMENT WALLET FOR IN-VEHICLE PAYMENTS

(71) Applicant: Honda Motor Co., Ltd., Tokyo (JP)

(72) Inventor: Narendran Ravi, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 16/404,500

(22) Filed: May 6, 2019

(65) Prior Publication Data

US 2020/0311716 A1 Oct. 1, 2020

Related U.S. Application Data

(60) Provisional application No. 62/827,710, filed on Apr. 1, 2019.

(51) Int. Cl.
| | | |
|---|---|---|
| G06Q 20/36 | (2012.01) | |
| H04W 4/40 | (2018.01) | |
| G06Q 20/32 | (2012.01) | |

(52) U.S. Cl.
CPC ....... *G06Q 20/3674* (2013.01); *G06Q 20/325* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 9,213,973 B2 | 12/2015 | Hurt et al. | |
| 9,589,405 B2 | 3/2017 | Cabouli et al. | |
| 9,888,363 B2 | 2/2018 | Addepalli et al. | |
| 10,032,319 B2 | 7/2018 | Ricci | |
| 11,139,955 B1 * | 10/2021 | So ....................... | G06Q 20/065 |

(Continued)

FOREIGN PATENT DOCUMENTS

| | | |
|---|---|---|
| DE | 102017208323 A1 | 11/2018 |
| WO | WO2018103586 A1 | 6/2018 |

OTHER PUBLICATIONS

"Pathak, Sujata and Rugnesh, Kanojia, Secured Vehicle Toll Payment System using NFC, Fourth International Conference on Computing Communication, 2018, 1-2" (Year: 2018).*

(Continued)

*Primary Examiner* — Christopher Bridges
*Assistant Examiner* — Toan Duc Bui
(74) *Attorney, Agent, or Firm* — Rankin, Hill & Clark LLP

(57) ABSTRACT

A system and method for layered authorization to manage a payment wallet for in-vehicle payments that include executing a vehicle connect application that allows a user to interface with a vehicle through a portable device. The vehicle connect application includes the payment wallet that is configured to be used to provide in-vehicle payments. The system and method also include determining if a plurality of layered authentication processes are successfully completed. The system and method further include allowing access and usage of the payment wallet through the vehicle connect application to complete the in-vehicle payments based on determining the successful completion of the plurality of layered authentication processes.

20 Claims, 5 Drawing Sheets

(56) References Cited

U.S. PATENT DOCUMENTS

| | | | |
|---|---|---|---|
| 2002/0169991 A1* | 11/2002 | Weinold | G06F 1/30 |
| | | | 713/324 |
| 2011/0060480 A1 | 3/2011 | Mottla et al. | |
| 2014/0136329 A1 | 5/2014 | Chang | |
| 2015/0058224 A1 | 2/2015 | Gaddam et al. | |
| 2015/0220916 A1* | 8/2015 | Prakash | G06Q 20/40 |
| | | | 705/41 |
| 2017/0190318 A1* | 7/2017 | Imamura | B60R 25/01 |
| 2017/0352095 A1* | 12/2017 | Jurss | H04L 63/102 |
| 2017/0357980 A1 | 12/2017 | Bakun | |
| 2018/0260882 A1 | 9/2018 | Friedman et al. | |
| 2018/0342001 A1 | 11/2018 | Chavarria | |
| 2019/0291589 A1* | 9/2019 | Erb | G06Q 20/18 |
| 2020/0202648 A1* | 6/2020 | Ammoura | B60R 25/241 |

OTHER PUBLICATIONS

"MD Arif Hassan and Zarina Shukur, Device Identify based User Authentication on Electronic Pyament System for SEcure E-Wallet Apps, Electronics, 2022, 19-22" (Year: 2022).*

* cited by examiner

SYSTEM AND METHOD FOR LAYERED AUTHORIZATION TO MANAGE A PAYMENT WALLET FOR IN-VEHICLE PAYMENTS

CROSS-REFERENCE TO RELATED APPLICATION

This application claims priority to U.S. Provisional Application Ser. No. 62/827,710 filed on Apr. 1, 2019, which is expressly incorporated herein by reference.

BACKGROUND

Mobile payment using virtual smart phone wallets and vehicle payment features have grown in popularity among consumers. However, there may be concerns associated with ensuring that an individual using a particular virtual smart phone wallet is actually an authorized user (e.g., owner of the smart phone, owner of the vehicle). For example, if the authorized user loses their smart phone or if a vehicle is accessed by another individual, there may be a concern with respect to the virtual smart phone wallet being used by an unauthorized individual. Additionally, if a user's password to login to the smart phone is compromised, there may also be a concern with respect to the virtual smart phone wallet being used by an unauthorized individual.

BRIEF DESCRIPTION

According to one aspect, a computer-implemented method for layered authorization to manage a payment wallet for in-vehicle payments that includes executing a vehicle connect application that allows a user to interface with a vehicle through a portable device. The vehicle connect application includes the payment wallet that is configured to be used to provide in-vehicle payments. The computer-implemented method also includes determining if a plurality of layered authentication processes are successfully completed. The computer-implemented method further includes allowing access and usage of the payment wallet through the vehicle connect application to complete the in-vehicle payments based on determining the successful completion of the plurality of layered authentication processes.

According to another aspect, a system for layered authorization to manage a payment wallet for in-vehicle payments that includes a memory storing instructions when executed by a processor cause the processor to execute a vehicle connect application that allows a user to interface with a vehicle through a portable device. The vehicle connect application includes the payment wallet that is configured to be used to provide in-vehicle payments. The instructions also cause the processor to determine if a plurality of layered authentication processes are successfully completed. The instructions further cause the processor to allow access and usage of the payment wallet through the vehicle connect application to complete the in-vehicle payments based on determining the successful completion of the plurality of layered authentication processes.

According to still another aspect, a non-transitory computer readable storage medium storing instructions that when executed by a computer, which includes a processor perform a method, the method includes executing a vehicle connect application that allows a user to interface with a vehicle through a portable device. The vehicle connect application includes a payment wallet that is configured to be used to provide in-vehicle payments. The method also includes determining if a plurality of layered authentication processes are successfully completed. The method further includes allowing access and usage of the payment wallet through the vehicle connect application to complete the in-vehicle payments based on determining the successful completion of the plurality of layered authentication processes.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
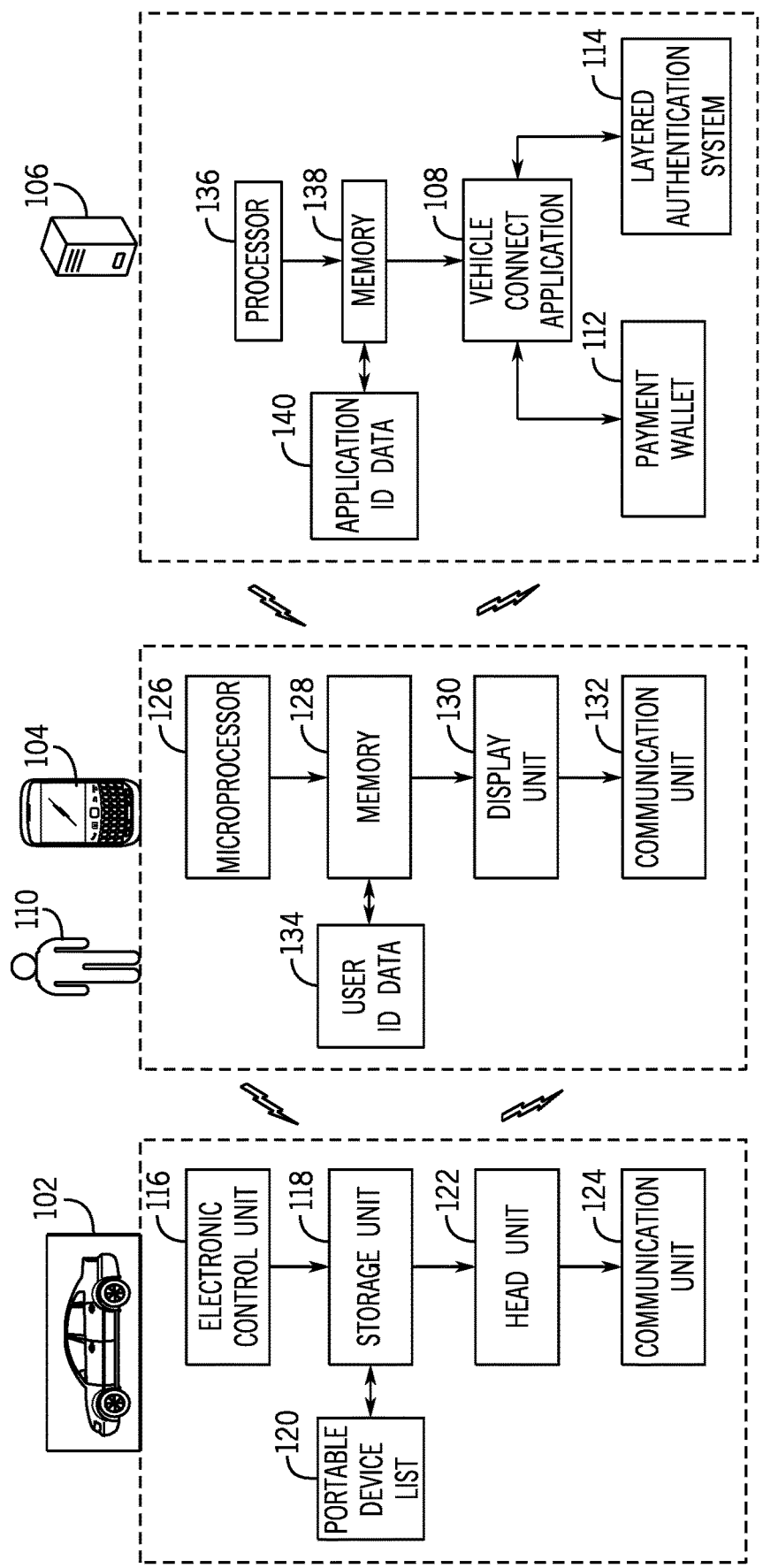
FIG. 1 is a schematic view of an exemplary operating environment for providing a layered authorization to securely manage a payment wallet session for in-vehicle payments according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system," as used herein may include, but are not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. System Overview

Referring now to the drawings, wherein the showings are for purposes of illustrating one or more exemplary embodiments and not for purposes of limiting the same, FIG. 1 is a schematic view of an exemplary operating environment 100 for providing a layered authorization to securely manage a payment wallet session for in-vehicle payments according to an exemplary embodiment of the present disclosure.

As shown, the operating environment 100 may include a vehicle 102 that may be communicably connected to a portable device 104. In an exemplary embodiment, the vehicle 102 and/or the portable device 104 may communicate with an external computing infrastructure 106 (external server) that stores a vehicle connect application 108 to execute the vehicle connect application 108 through the vehicle 102 and/or the portable device 104. The vehicle connect application 108 may be developed and provided by a manufacturer of the vehicle 102 (OEM) and/or a third party (e.g., third party application developer) to provide a user 110 (e.g., driver, passenger) of the vehicle 102 and the portable device 104 with access to one or more features and functions of the vehicle 102.

In particular, the vehicle connect application 108 may include a plurality of interfaces (i.e., HMIs) that may be utilized to connect, operate, and access one or more systems, functions, features, and/or services of the vehicle 102. The vehicle connect application 108 may be configured to allow the user 110 to interactively utilize and/or apply one or more features or functions of the vehicle 102. Such features may include, but may not be limited to, setup of user settings (e.g., seat settings, climate control settings, audio settings), pairing of devices, setup of approved vehicle users, and the utilization of one or more functions through one or more components of the vehicle 102, such as the completion of in-vehicle secure payments through the portable device 104 and/or the vehicle 102.

In one embodiment, the vehicle connect application 108 may include a payment wallet 112 that may be accessed by the user 110 through the portable device 104 and/or the vehicle 102 to provide the functionality of securely completing in-vehicle payments. The payment wallet 112 may be configured as a virtual wallet that may be linked to one or more linked accounts (e.g., external banking accounts, credit card accounts, pre-paid accounts, etc.) as setup by the user 110 and/or a third-party entity (e.g., bank, OEM). The payment wallet 112 may allow the user 110 to utilize the portable device 104 and/or components of the vehicle 102 to provide in-vehicle payments to one or more vendors (e.g., service provides, merchants, restaurants, fuel stations, energy stations, toll stations, etc.) upon the user 110 passing through a plurality of layered authentication processes that are required to access and utilize the payment wallet 112.

The vehicle connect application 108 may include a layered authentication system 114 that executes the plurality of layered authentication processes to securely manage usage of the payment wallet 112 of the vehicle connect application 108. As discussed in more detail below, the plurality of layered authentication processes may include, but may not be limited to a portable device authentication process layer, a vehicle access/enablement authentication process layer, an application access authentication process layer, and an active connection authentication process layer. It is appreciated that additional contemplated layers of authentication may be utilized by the layered authentication system 114 to thereby authenticate the user 110.

As discussed in more detail below with respect to the plurality of layered authentication processes, the layered authentication system 114 may be utilized to authenticate the user 110 to access and use the payment wallet 112 if it is determined that the user 110 is authorized to use the portable device 104 (e.g., as the owner of the portable device 104), the user 110 is authorized to access and use the vehicle connect application 108, the user 110 unlocks the vehicle 102 and/or enables one or more ignition states of the vehicle 102 (e.g., has a key fob that is associated with the vehicle 102 and can be used to unlock the door(s) of the vehicle 102 and turn on one or more ignition states of the vehicle 102), and the portable device 104 associated with the user 110 is actively connects to the vehicle 102. This layered authentication system 114 functions to thereby ensure that the payment wallet 112 may not be accessed by non-authorized individual and that the in-vehicle payments are securely completed.

Upon the determined successful completion of the plurality of layered authentication processes, the layered authentication system 114 may allow the user 110 to access the payment wallet 112 of the vehicle connect application 108 to provide one or more in-vehicle payments. In other words, upon the system 114 determining that the plurality of layered authentication processes are successfully completed, the payment wallet 112 may be activated and the user 110 may accordingly access one or more user interfaces associated with the payment wallet 112 to complete one or more in-vehicle payments (e.g., for tolls, food, fuel, goods, services, etc.) using one or more linked accounts through one or more display units of the vehicle 102 and/or through the portable device 104.

With reference to the vehicle 102, the components of the vehicle 102 may be operably controlled by an electronic control unit 116 (ECU) of the vehicle 102. The ECU 116 may be configured to execute one or more applications including but not limited to the vehicle connect application 108. The ECU 116 may also be configured to execute one or more operating systems, vehicle system and subsystem executable instructions, vehicle sensor logic, and the like. In one or more embodiments, the ECU 116 may include a microprocessor, one or more application-specific integrated circuit(s) (ASIC), or other similar devices.

The ECU 116 may also include respective internal processing memory, an interface circuit, and bus lines for transferring data, sending commands, and communicating with the plurality of components of the vehicle 102. In one or more configurations, the ECU 116 may include a respective communication device (not shown) for sending data internally to components of the vehicle 102 and communicating with externally hosted computing systems (not shown) (e.g., external to the vehicle 102). Generally the ECU 116 may communicate with a storage unit 118 to execute one or more applications, operating systems, vehicle systems and subsystem user interfaces, and the like that are stored on the storage unit 118.

In one embodiment, the storage unit 118 may be configured to store a portable device list 120. The portable device list 120 may include a listing of one or more portable device attributes associated with one or more portable devices that may be pre-configured to be associated with the vehicle 102 and to communicate with the vehicle 102 (e.g., key fob that is configured to communicate RF commands to the vehicle 102 to execute one or more commands) and/or previously paired with the vehicle 102 (e.g., smart phone which has been paired to communicate data with the vehicle 102).

In one embodiment, the portable device list 120 may include a device identification (device ID) that may include a numeric/alpha-numeric identification that may be utilized to specifically identify each portable device that may be pre-configured to communicate with the vehicle 102 and/or previously paired to the vehicle 102. For example, if the portable device 104 is pre-configured to communicate with the vehicle 102 and/or has been previously paired to the vehicle 102, the portable device list 120 may include a device ID which is specifically associated with the portable device 104 and may be utilized to specifically identify the portable device 104.

In another embodiment, the portable device list 120 may include a media access control address (MAC address) that includes a unique identifier that is associated to a communication unit 132 of each portable device 104 that may be pre-configured to communicate with the vehicle 102 and/or previously paired to the vehicle 102. For example, if the portable device 104 is pre-configured to communicate with the vehicle 102 and/or has been previously paired to the vehicle 102, the portable device list 120 may include a MAC address which is specifically associated with a communication unit 132 of the portable device 104 and may be utilized to specifically identify the portable device 104.

As discussed below, the layered authentication system 114 may access the storage unit 118 to analyze the portable device list 120 to complete one or more of the plurality of layered authentication processes. For example, the layered authentication system 114 may ensure that the device ID or the MAC address retrieved from the portable device 104 through one or more communication signals received from the portable device 104 is included within the portable device list 120 to allow the user 110 to unlock the vehicle 102, enable one or more ignition states of the vehicle 102, and/or allow an active wired and/or wireless computer connection between the vehicle 102 and the portable device 104.

In an exemplary embodiment, the ECU 116 may also be operably connected to a head unit 122 of the vehicle 102. The head unit 122 may be configured to execute one or more application, application interfaces, and/or communicate with one or more components of the vehicle 102 to provide one or more interfaces to the user 110 within the vehicle 102. In one embodiment, the head unit 122 may operably control and may be operably connected to one or more display units (not shown) within the vehicle 102.

The head unit 122 may operably control the display unit(s) to present one or more interfaces of the vehicle connect application 108 within the vehicle 102. In one embodiment, upon the determination that the plurality of layered authentication processes have been successfully completed, the layered authentication system 114 may communicate with the head unit 122 to thereby present one or more interfaces of the payment wallet 112 to allow the user 110 to complete secure in-vehicle payments through the vehicle 102.

In one configuration, one or more interfaces of the payment wallet 112 may be presented with one or more user interface text boxes, drop down boxes, radio buttons, icons, and the like that may allow the user 110 to input payment details. Such payment details may include, but may not be limited to, a payee, a payment amount, a payment account/source (e.g., bank account), a payment memo, etc. In one or more configurations, one or more of the payment details may be automatically populated based on external data that may be provided to the vehicle connect application 108.

Such external data may include, but may not be limited to, vendor data that is communicated through an internet connection and/or through the portable device 104, GPS data/vehicle location data that may be communicated by a navigation system (not shown) of the vehicle 102, and/or financial information data that may be communicated by a financial institution that is associated with a payment account/source. For example, the vehicle connect application 108 may automatically populate a payee of a particular in-vehicle payment based on location data associated with a current location of a vehicle 102. In some embodiments, the one or more interfaces of the payment wallet 112 may also include a payment verification interface that allows the user 110 to view a summary of each payment before it is completed. Additionally, the one or more interfaces of the payment wallet 112 may additionally include a payment confirmation interface that allows the user 110 to view a confirmation of each payment after it has been completed.

In an exemplary embodiment, the ECU 116 may additionally be operably connected to a communication unit 124 of the vehicle 102. The communication unit 124 may communicate with one or more components of the operating environment 100 and/or additional systems and components outside of the operating environment 100. The communication unit 124 may include, but is not limited to, one or more transceivers (not shown) of the vehicle 102 and additional components (not shown) that may be utilized for wired and wireless computer connections and communications via various protocols with one or more portable devices that may located within a (predetermined) communicable range with the communication unit 124 of the vehicle 102. For example, the communication unit 124 may be utilized for wired and wireless computer connections that may include an active computer connection with the portable device 104.

In one embodiment, the communication unit 124 may be utilized to pair the portable device 104 to the vehicle 102 such that the vehicle 102 may be able to identify and authorize the portable device 104 to initiate an active communication connection between the portable device 104 and the vehicle 102. Accordingly, the user 110 may utilize one or more user interfaces, input buttons, and/or voice commands within the vehicle 102 to pair the portable device 104 with the vehicle 102. Upon the pairing of the portable device 104 with the vehicle 102, the communication unit 132 of the portable device 104 may communicate the device ID of the portable device 104 and/or the MAC address of the communication unit 132 to the communication unit 124 of the vehicle 102.

The communication unit 124 and/or the ECU 116 may accordingly access the portable device list 120 stored on the storage unit 118 and may update a field associated with the portable device 104 with the device ID and/or the MAC address. As discussed below, if the user 110 enters the vehicle 102 and connects the portable device 104 to the vehicle 102 through a wire (e.g., USB connection) and/or a wireless connection (e.g., Bluetooth connection) is initiated between the portable device 104 and the vehicle 102, the ECU 116 may query the portable device list 120 to thereby allow the active computer connection to be completed. As discussed below, the completion of the active computer connection between the portable device 104 and the vehicle 102 may be analyzed to determine that the active connection authentication process layer has successfully completed as one of the plurality of layered authentication processes that are to be successfully completed to allow the user 110 to access and use the payment wallet 112 of the vehicle connect application 108.

In one or more embodiments, the communication unit 124 may also access the storage unit 118 to analyze the portable device list 120 if one or more command signals are received by one or more portable devices. The one or more command signals may include door unlock signals, door lock signals, window open signals, window close signals, key fob location based signals, engine enable signals, engine disable signals, and the like that may be sent based on user actuation of one or more input buttons of the one or more portable devices (e.g., key fobs), through one or more interfaces of the vehicle connect application 108 that are being presented through one or more portable devices, and/or the input of one or more functions of the vehicle 102 (e.g., push start button to enable one or more ignition states of the vehicle 102).

In particular, the one or more command signals may include a data packet (e.g., data payload packet) that may include the device ID of the respective portable device(s) and/or the MAC address of the communication unit 132 of the respective portable device(s) 104 that transmits the command signal(s). The communication unit 124 may also access the storage unit 118 to analyze the portable device list 120 to ensure that the portable device 104 may be pre-configured to communicate with the vehicle 102 and/or previously paired to the vehicle 102.

For example, if the user 110 utilizes the portable device 104 to input a door unlock input button to unlock a door of the vehicle 102, the communication unit 132 of the portable device 104 may be configured to transmit one or more respective communication signals to the communication unit 124 of the vehicle 102. The one or more communication signals may include data packet(s) that may include the device ID of the portable device 104 and/or the MAC address of the communication unit 132. Accordingly, the device ID and/or the MAC address may be analyzed upon receipt by the communication unit 124 of the vehicle 102. In particular, the communication unit 124 of the vehicle 102 may access the storage unit 118 to analyze the portable device list 120 to determine if the device ID and/or MAC address included within the command signal(s) is included within the portable device list 120 to thereby determine if the portable device 104 may be pre-configured to be associated with and to communicate with the vehicle 102 and/or previously paired to the vehicle 102.

If it is determined that the device ID and/or MAC address included within the command signal(s) are included within the portable device list 120, the communication unit 124 may communicate respective data to the ECU 116 and the ECU 116 may operably control one or more locks of the vehicle 102 to be unlocked based on the user's input. Additionally, the ECU 116 may enable one or more ignition states of the vehicle 102 to be enabled by the user 110 if the portable device 104 is determined to be within a predetermined vicinity (e.g., within an internal portion) of the vehicle 102. In an exemplary embodiment, the completion of unlocking of the vehicle 102 and/or the enablement of one or more ignition states of the vehicle 102 may be analyzed to determine that the vehicle access/enablement authentication process layer has successfully completed as one of the plurality of layered authentication processes that are to be successfully completed for the user 110 to access the payment wallet 112 of the vehicle connect application 108.

In one or more configurations, the portable device 104 may include, but may not be limited to a smart phone, a handheld device, a key fob, a mobile communication device, a laptop, a tablet, an e-reader, and the like. Components of the portable device 104 may be operably controlled by a microprocessor 126 of the portable device 104. The microprocessor 126 may also include respective internal processing memory, an interface circuit, and bus lines for transferring data, sending commands, and communicating with the plurality of components of the portable device 104. The microprocessor 126 may be operably connected to a memory 128 of the portable device 104.

In an exemplary embodiment, the microprocessor 126 may communicate with the memory 128 to execute one or more applications, operating systems, vehicle systems, subsystem user interfaces, and data files, including but not limited to data files of the vehicle connect application 108 that may be stored on the memory 128 of the portable device 104. The memory 128 may also be configured to store a user identification data 134 (user ID data) (not shown) that may be utilized to authenticate the user 110 of the portable device 104 to unlock and use the portable device 104. The user ID data may include encrypted data that may pertain to user credentials including, but not limited to a passcode, pin, user name, and the like that may be utilized to authenticate and authorize the user 110 to unlock and use the portable device 104. The user ID data may also include encrypted data that pertains to biometric identifiers that may include, but may not be limited to, facial detection, pupil/iris/retina detection, finger print detection, voice detection, and the like that may be utilized to authenticate and authorize the user 110 to unlock and use the portable device 104.

In one embodiment, when the portable device 104 is setup by the user 110, the user 110 may be able to input the user credentials and/or allow one or more sensors (not shown) to determine one or more biometric identifiers that may be utilized to authenticate and authorize the user 110 to unlock and use the portable device 104. Upon determining the input of user credentials and/or the sensing of one or more biometric identifiers, the microprocessor 126 of the portable device 104 may be configured to access the memory 128 to update the user ID data 134 with encrypted data that pertains to the user credentials and/or the one or more biometric identifiers.

In an exemplary embodiment, upon the user 110 attempting to utilize the portable device 104, the user 110 may be prompted to enter the user credentials and/or allow the sensors of the portable device 104 to read biometric information (e.g., face scan, eye scan, finger print scan). Data provided based on the entering of user credentials and/or reading of biometric information may be received by the microprocessor 126 and compared to the encrypted data of the user ID data 134 to thereby determine if the user 110 is authenticated and authorized to unlock and use the portable device 104. As discussed below, the authenticating and authorizing of the user 110 to unlock and use the portable device 104 may be analyzed to determine that the portable device authentication process layer has successfully completed as one of the plurality of layered authentication processes that are to be successfully completed for the user 110 to access the payment wallet 112 of the vehicle connect application 108.

In one or more embodiments, the portable device 104 may include a display unit 130. In one embodiment, the microprocessor 126 may operably control the display unit 130 to present one or more interfaces of the vehicle connect application 108 within the vehicle 102. For example, the display unit 130 may be configured to present an application login user interface of the vehicle connect application 108 that allows the user to input application credentials and/or to actuate the sensors of the portable device 104 to read biometric information (e.g., face scan, eye scan, finger print scan) that may be utilized to authenticate and authorize the user 110 to access and use the vehicle connect application 108.

In one embodiment, upon the determination that the plurality of layered authentication processes have been successfully completed, the layered authentication system 114 may communicate with the microprocessor 126 to thereby present one or more interfaces of the payment wallet 112 through the display unit 130 to allow the user 110 to complete in-vehicle payments through the portable device 104 and/or the vehicle 102.

The one or more interfaces of the payment wallet 112 may be presented with one or more user interface text boxes, drop down boxes, radio buttons, icons, and the like that may allow the user 110 to input payment details as discussed above. Additionally, the one or more interfaces of the payment wallet 112 that may be presented through the display unit 130 may also include the payment verification interface that allows the user 110 to view a summary of each payment before it is completed. Additionally, the one or more interfaces of the payment wallet 112 that may be presented through the display unit 130 may additionally include the payment confirmation interface that allows the user 110 to view a confirmation of each payment after it has been completed.

In an exemplary embodiment, the portable device 104 may include one or more physical input buttons (not shown) that may be utilized to actuate one or more features and functions of the portable device 104 and/or the vehicle 102. For example, one or more physical input buttons may include a door unlock button, a door lock button, a vehicle ignition enable button, a trunk open button, and a panic alarm button that may be inputted to actuate one or more respective features and functions of the vehicle 102. In another embodiment, the display unit 130 may also be configured to present one or more user interface input buttons (not shown) that may be similarly utilized to actuate one or more features and functions of the portable device and/or the vehicle 102. Upon the input one or more physical input buttons and/or one or more user interface input buttons, the microprocessor 126 may be configured to utilize the communication unit 132 to transmit one or more command signals (e.g., RF signals) to be received by the communication unit 124 of the vehicle 102 when the vehicle 102 is within a predetermined proximity of the vehicle 102.

In one embodiment, the communication unit 132 may also be configured to send one or more communication signals to a communication unit 124 of the vehicle 102. The communication unit 132 may also be configured to receive one or more communication signals from the communication unit 124 of the vehicle 102. As discussed, the communication unit 132 may be configured to wirelessly connect (e.g., through a Bluetooth connection, Wi-Fi connection, etc.) with the communication unit 124 of the vehicle 102 to enable the portable device 104 to be a paired device which is communicably paired to the vehicle 102.

In one embodiment, when the portable device 104 is initially paired to the vehicle 102, the communication unit 132 may include the device ID of the portable device 104 and/or the MAC address assigned to the communication unit 132 within each communication signal that is transmitted to the communication unit 124 of the vehicle 102. As discussed, upon receipt, the ECU 116 may be configured to compare the device ID or MAC address received within each signal to the portable device list 120 to determine if the portable device 104 is pre-configured to communicate with the vehicle 102 and/or previously paired to the vehicle 102. This functionality may allow the user 110 to unlock the vehicle 102 and enable one or more ignition states of the vehicle 102. This functionality may also allow an active computer communication connection to be completed between the portable device 104 and the vehicle 102.

In an exemplary embodiment, the communication unit 124 of the vehicle and/or the communication unit 132 of the portable device 104 may be configured to connect to an internet cloud (not shown) to enable wireless communications with the external server 106 that stores the vehicle connect application 108. In an exemplary embodiment, the external server 106 may include a processor 136 that may operably control one or more components of the external server 106. In some configurations, the processor 136 may be configured to execute the vehicle connect application 108. The processor 136 may also be configured to execute the plurality of layered authentication processes completed by a plurality of components of the layered authentication system 114. Accordingly, the processor 136 may execute the payment wallet 112 of the vehicle connect application 108 upon the determination by the layered authentication system 114 of the successful completion of the plurality of layered authentication processes.

In one embodiment, the memory 138 of the external server 106 may store data files associated with one or more applications, operating systems, vehicle systems, subsystem user interfaces, including but not limited to data files of the vehicle connect application 108. The memory 138 may also be configured to store application identification data 140 that may be utilized to authenticate the user 110 of the vehicle connect application 108 to access and use the vehicle connect application 108. The application ID data may include encrypted data that may pertain to user credentials including, but not limited to a passcode, pin, user name, password, and the like that may be utilized to authenticate and authorize the user 110 to access and use the vehicle connect application 108. The applicant ID data may also include encrypted data that pertains to biometric identifiers that may include, but may not be limited to, facial detection, pupil/iris/retina detection, finger print detection, voice detection, and the like that maybe utilized to authenticate and authorize the user 110 to access and use the vehicle connect application 108.

In one embodiment, during an initial execution of the vehicle connect application 108 or setup of a new application user account associated with the vehicle connect application by the user 110, the user 110 may be able to input the user credentials and/or allow one or more sensors (not shown) to determine one or more biometric identifiers that may be utilized to authenticate and authorize the user 110 to access and use the vehicle connect application 108. Upon determining the input of user credentials and/or the sensing of one or more biometric identifiers, the microprocessor 126 of the portable device 104 may be configured to access the memory 128 to update the application ID data 140 with encrypted data that pertains to the user credentials and/or the one or more biometric identifiers.

In an exemplary embodiment, upon the user 110 attempting to access and use the vehicle connect application 108 through the display unit(s) of the vehicle 102 and/or the display unit 130 of the portable device 104, the user 110 may be prompted to enter the user credentials and/or allow the sensors of the portable device 104 to read biometric information (e.g., face scan, eye scan, finger print scan). Data provided based on the entering of user credentials and/or reading of biometric information may be received by the processor 136 and compared to the encrypted data of the application ID data 140 to thereby determine if the user 110 is authenticated and authorized to access and use the vehicle connect application 108. As discussed below, the authenticating and authorizing the user 110 to access and use the vehicle connect application 108 may be analyzed to determine that the application access authentication process layer has successfully completed as one of the plurality of layered authentication processes that are to be successfully completed for the user 110 to access the payment wallet 112 of the vehicle connect application 108.

II. The Layered Authentication System and Related Methods

The general functionality of the layered authentication system 114 will now be discussed. In an exemplary embodiment, the vehicle connect application 108 and one or more features and systems of the application 108, including but not limited to the payment wallet 112 and the layered authentication system 114 may be fully or partially executed by the processor 136 of the external server 106 and data may be communicated through the internet cloud to allow the application 108 to be utilized through the vehicle 102 and/or the portable device 104. In additional embodiments, the vehicle connect application 108 and one or more features and systems of the application 108, including but not limited to the payment wallet 112 and the layered authentication system 114 may be fully or partially executed by the ECU 116 of the vehicle 102 and/or the microprocessor 126 of the portable device 104.

Figure 2:
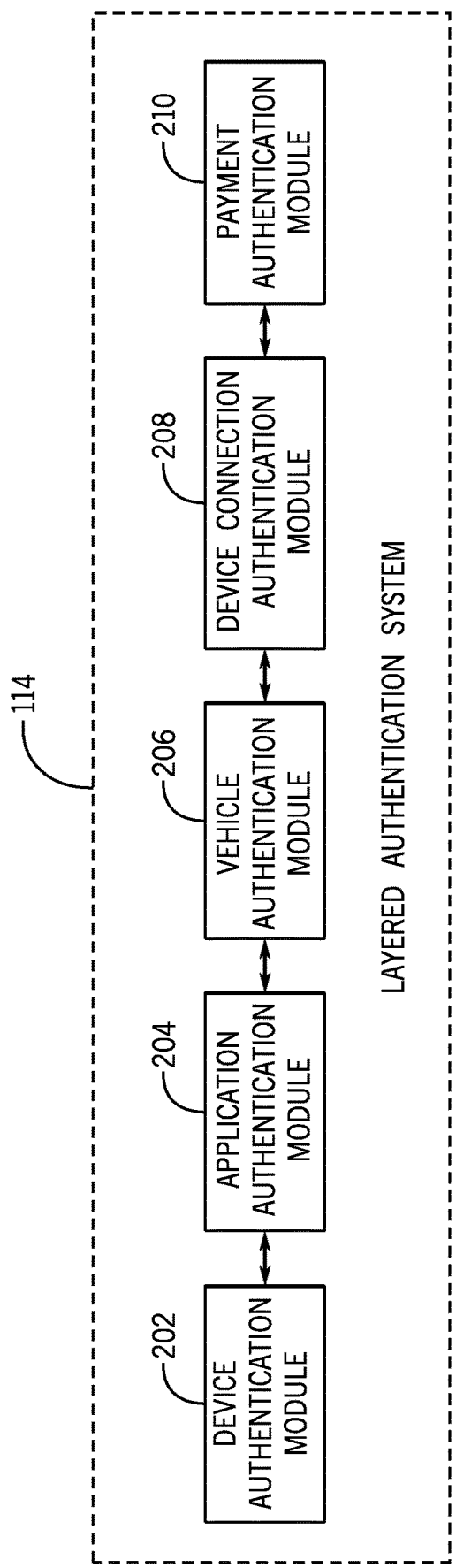
FIG. 2 is a schematic view of a plurality of modules of the layered authentication system for determining a successful completion of a plurality of layered authentication processes according to an exemplary embodiment of the present disclosure.

FIG. 2 is a schematic view of a plurality of modules 202-210 of the layered authentication system 114 for determining the successful completion of the plurality of layered authentication processes according to an exemplary embodiment of the present disclosure. The plurality of modules 202-210 that may collectively determine that the plurality of layered authentication processes have been successfully completed to thereby allow the user 110 to access and use the payment wallet 112 to complete in-vehicle payments through the vehicle 102 and/or the portable device 104. In an exemplary embodiment, the plurality of modules 202-210 may include a device authentication module 202, an application authentication module 204, a vehicle authentication module 206, a device connection authentication module 208, and a payment authorization module 210. It is appreciated that the layered authentication system 114 may include one or more additional modules and/or sub-modules that are included in addition or in lieu of the modules 202-210.

In one embodiment, the device authentication module 202 may be configured to determine if the portable device authentication process layer is successfully completed based on authenticating and authorizing the user 110 to use the portable device 104 (e.g., unlock and use the portable device 104). If the device authentication module 142 determines that the portable device authentication process layer is successfully completed based on the user 110 successfully unlocking the portable device 104, the device authentication module 142 may communicate respective data to the payment authorization module 210 of the layered authentication system 114.

In one or more embodiments, the application authentication module 204 may be configured to determine if the based on authenticating and authorizing the user 110 to access and use the vehicle connect application 108 (e.g., to login to the application 108 and use the application 108). If the application authentication module 144 determines that the application authentication process layer is successfully completed based on the user 110 successfully accessing the vehicle connect application 108, the application authentication module 144 may communicate respective data to the payment authorization module 210 of the layered authentication system 114.

In one configuration, the vehicle authentication module 206 may be configured to determine if the vehicle access/enablement authentication process layer is successfully completed based on the user's authorized access and unlocking of the vehicle 102 to enter the vehicle 102 and enablement of one or more ignition states of the vehicle 102. If the vehicle authentication module 146 determines that the vehicle access/enablement authentication process layer is successfully completed based on the user 110 unlocking the door(s) of the vehicle 102 and/or enabling one or more ignition states of the vehicle 102, the vehicle authentication module 206 may communicate respective data to the payment authorization module 210 of the layered authentication system 114.

In one embodiment, the device connection authentication module 208 may be configured to determine if the active connection authentication process layer is successfully completed based on the successful completion of the active wired and/or wireless computer connection between the vehicle 102 and the portable device 104. If the device connection authentication module 148 determines that the active connection authentication process layer is successfully completed based on an active connection between the portable device 104 and the vehicle 102, the device connection authentication module 148 may communicate respective data to the payment authorization module 210 of the layered authentication system 114.

In an exemplary embodiment, upon the receipt of data pertaining to the successful completion of respective authentication processes by the device authentication module 202, the application authentication module 204, the vehicle authentication module 206, and the device connection authentication module 208, the payment authorization module 210 may determine that the plurality of layered authentication processes are successfully completed. Upon determining that the plurality of layered authentication processes are successfully completed, the payment authorization module 210 may be configured to communicate with the processor 136, the ECU 116, and/or the microprocessor 126 to execute the payment wallet 112 of the vehicle connect application 108. The payment authorization module 210 may thereby allow the user 110 to access and use one or more interfaces of the payment wallet 112 of the vehicle connect application 108 to securely complete one or more in-vehicle payments using one or more linked accounts through the vehicle 102 and/or the portable device 104.

In one embodiment, the payment authorization module 210 may maintain an authorized trust provided to the user 110 to access and use the payment wallet 112 during a point in time at which one or more ignition modes of the vehicle 102 are enabled. In other words, the user 110 may be able to access and use the payment wallet 112 to complete one or more in-vehicle payments until the ignition modes of the vehicle 102 are disabled and the vehicle 102 is disabled. In particular, the ECU 116 may communicate with the payment authorization module 210 when the user 110 disables the ignition modes of the vehicle 102 (e.g., the user 110 uses a push button to turn off the vehicle 102) and the vehicle 102 is fully disabled. The payment authorization module 210 may thereby disable the payment wallet 112 and end the authorized trust provided to the user 110 thereby disallowing it from being used. The layered authentication system 114 may thereby determine if the plurality of layered authentication processes have been completed at a subsequent point(s) in time to thereby (re)allow the user 110 to access and use the payment wallet 112 to complete in-vehicle secure payments through the portable device 104 and/or the vehicle 102.

Figure 3:
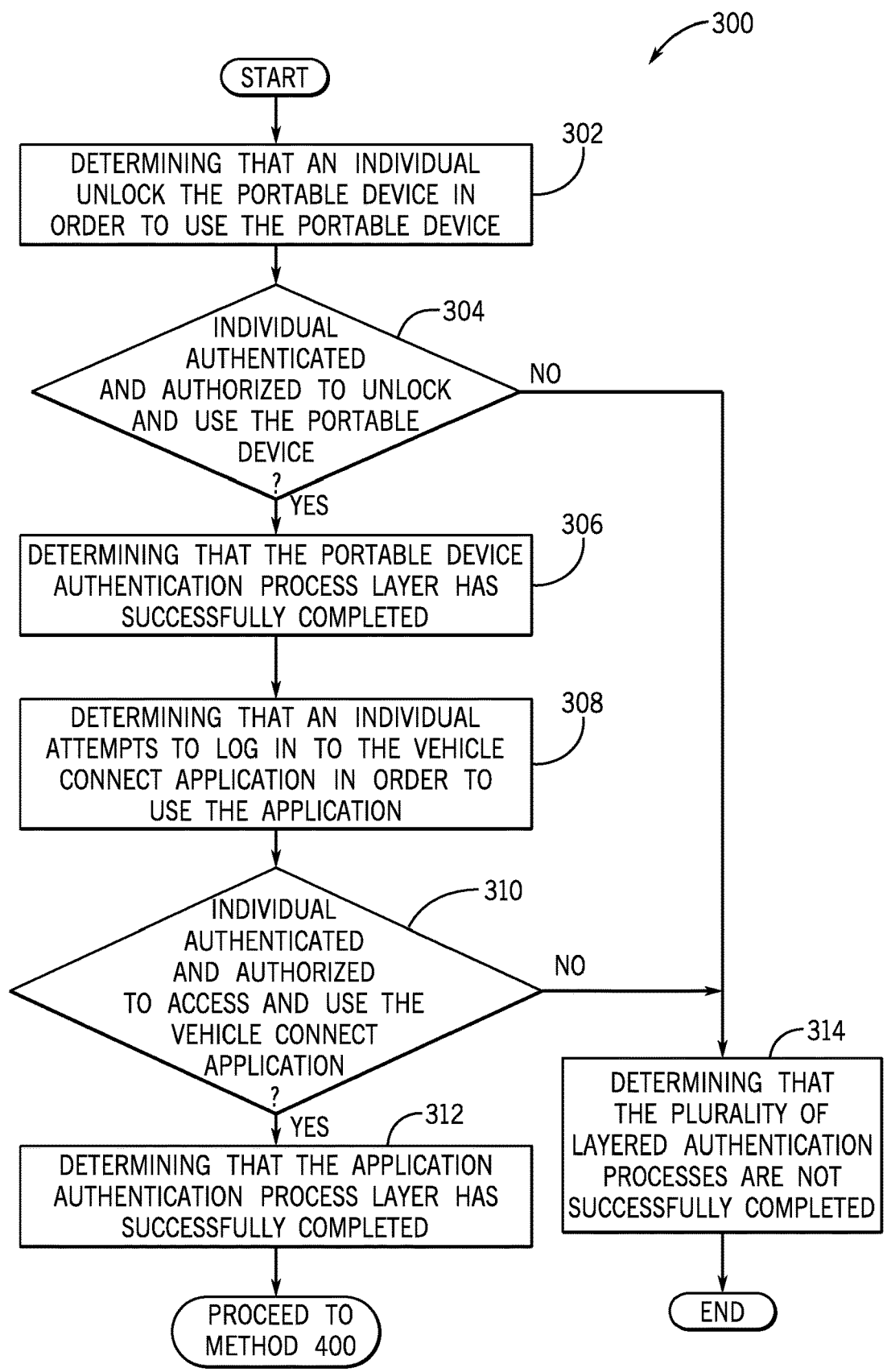
FIG. 3 is a process flow diagram of a method for determining a successful completion of a portable device authentication process layer and an application authentication process layer according to an exemplary embodiment of the present disclosure.

FIG. 3 is a process flow diagram of a method 300 for determining the successful completion of the portable device authentication process layer and the application authentication process layer according to an exemplary embodiment of the present disclosure. FIG. 3 will be described with reference to the components of FIG. 1 and FIG. 2, though it is to be appreciated that the method 300 of FIG. 3 may be used with additional and/or alternative system components. The method 300 and method 400 of FIG. 4 described below includes the determination of the completion of each of the plurality of layered authentication processes in a particular order. However, it is to be appreciated that the layered authentication system 114 may determine the completion of each of the plurality of layered authentication processes in any contemplated order that may occur between ignition cycles of the vehicle 102 (e.g., after the vehicle 102 has been fully disabled).

The method 300 may begin at block 302, wherein the method 300 may include determining that an individual attempts to unlock the portable device 104 in order to use the portable device 104. In an exemplary embodiment, the portable device 104 may be put into a locked mode that disallows access to one or more interfaces of the portable device 104 to be presented through the display unit 130. Upon an individual (e.g., the user 110) attempting to unlock the portable device 104 by starting a login sequence (e.g., inputting a particular input button, placing finger on a finger print reader, holding the portable device 104 to scan face/eyes, etc.), the microprocessor 126 may determine that an individual is attempting to unlock the portable device 104 in order to use the portable device 104. The microprocessor 126 may thereby communicate respective data to the device authentication module 202 of the layered authentication system 114.

The method 300 may proceed to block 304, wherein the method 300 may include determining if the individual is authenticated and authorized to unlock and use the portable device 104. In an exemplary embodiment, the device authentication module 202 may communicate with the microprocessor 126 to determine if the microprocessor 126 authenticates the user 110 to unlock and use the portable device 104. As discussed above, the memory 128 of the portable device 104 may store the user ID data 134. The user ID data 134 may include encrypted data that may pertain to user credentials including, but not limited to a passcode, pin, user name, and the like that may be utilized to authenticate and authorize the individual (user 110) to unlock and use the portable device 104. The user ID data 134 may also include encrypted data that pertains to biometric identifiers that may include, but may not be limited to, facial detection, pupil/iris/retina detection, finger print detection, voice detection, and the like that may be utilized to authenticate and authorize the individual to unlock and use the portable device 104.

In an exemplary embodiment, upon the user 110 attempting to utilize the portable device 104, the user 110 may be prompted to enter the user credentials and/or allow the sensors of the portable device 104 to read biometric information (e.g., face scan, eye scan, finger print scan). Data provided based on the entering of user credentials and/or reading of biometric information may be received by the microprocessor 126 and compared to the encrypted data of the user ID data 134 to thereby determine if the user 110 is authenticated and authorized to unlock and use the portable device 104. If the data provided based on the entering of user credentials and/or reading of biometric information may be received by the microprocessor 126 and compared to the encrypted data of the user ID data 134, the individual may be determined to be a user 110 that may unlock the portable device 104.

If it is determined that the individual is not authenticated and authorized to unlock the portable device 104 in order to use the portable device 104 (at block 304), the method 300 may proceed to block 314, wherein the method 300 may include determining that the plurality of layered authentication processes are not successfully completed. In an exemplary embodiment, if its determined that data provided by the individual entering user credentials and/or reading of biometric information do not match with the encrypted data of the user ID data 134, the microprocessor 126 may thereby communicate respective data to the device authentication module 202.

The device authentication module 202 may thereby determine that the portable device authentication process layer has not been successfully completed and may communicate respective data to the payment authorization module 210. In some embodiments, the device authentication module 202 may present a user interface through the display unit 130 of the portable device 104 and/or the display unit(s) of the vehicle 102 that includes a message explaining that access is denied to the payment wallet 112 based on the denial of the user authorization and authentication of the portable device 104 which lead to the unsuccessful completion of the portable device authentication process layer.

In one embodiment, the payment authorization module 210 may thereby determine that the plurality of layered authentication processes are not successfully completed based on the unsuccessful completion of the portable device authentication process layer. The payment authorization module 210 may accordingly prohibit access and use of the payment wallet 112. Access and usage of the payment wallet 112 of the vehicle connect application 108 may be prohibited until the module 210 determines that the plurality of layered authentication processes are successfully completed. As an illustrative example, if the display unit(s) of the vehicle 102 are utilized to display one or more interfaces of the vehicle connect application 108, the user 110 and/or another individual may not be allowed to access and use any of the interfaces of the payment wallet 112 through the vehicle 102 and/or the portable device 104 until the plurality of layered authentication processes are successfully completed.

If it is determined that the individual is authenticated and authorized to unlock and use the portable device 104 (at block 304), the method 300 may proceed to block 306, wherein the method 300 may include determining that the portable device authentication process layer has successfully completed. In an exemplary embodiment, if its determined that data provided by the individual entering user credentials and/or reading of biometric information matches with the encrypted data of the user ID data 134 and the individual unlocks the portable device 104, the microprocessor 126 may thereby communicate respective data to the device authentication module 202. The device authentication module 202 may thereby determine that the portable device authentication process layer has been successfully completed and may communicate respective data to the payment authorization module 210. The payment authorization module 210 may thereby determine that the portable device authentication process layer of the plurality of layered authentication processes has been successfully completed and may thereby communicate with the modules 204-208 to determine if additional respective authentication processes have been successfully completed.

The method 300 may proceed to block 308, wherein the method 300 may include determining that an individual attempts to log in to the vehicle connect application 108 in order to use the application 108. In an exemplary embodiment, if the vehicle connect application 108 is not utilized for a predetermined period of time, the application 108 may be disabled. In additional embodiments, the application 108 may be disabled based on the user 110 manually exiting the application 108 through the display unit 130 of the portable device 104 and/or through the display unit(s) of the vehicle 102. In an alternate embodiment, the vehicle connect application 108 may be automatically disabled upon the ECU 116 determining that the ignition states of the vehicle 102 have been disabled. In order words, the application 108 may be disabled when vehicle 102 is completely turned off. Upon the disablement of the application 108, access and usage of one or more interfaces of the vehicle connect application 108 that are presented through the display unit 130 of the portable device 104 and/or through the display unit(s) of the vehicle 102 may not be allowed until the individual is authenticated and authorized to access and use the vehicle connect application 108.

In one configuration, upon an individual attempting to access and use the vehicle connect application 108 through the portable device 104 and/or through the display unit(s) of the vehicle 102 by starting a login sequence, the microprocessor 126 and/or the ECU 116 may send data pertaining to the login attempt to the processor 136 of the external server 106. The processor 136 may thereby determine that an individual is attempting to login into/access the vehicle connect application 108 in order to use the application 108. The processor 136 may thereby communicate respective data to the application authentication module 204 of the layered authentication system 114.

The method 300 may proceed to block 310, wherein the method 300 may include determining if the individual is authenticated and authorized to access and use the vehicle connect application 108. In an exemplary embodiment, the application authentication module 204 may communicate with the processor 136 to determine if the processor authenticates the individual to access and use the vehicle connect application 108 through the portable device 104 and/or through the vehicle 102 based on authenticating data that is inputted and/or received by the portable device 104 and/or through the vehicle 102. Such data may be provided in the form of a user name and password that is received through the portable device 104 and/or through the head unit 122 of the vehicle 102. Additionally, such data may be provided in the form of biometric identifiers that may include, but may not be limited to, facial detection, pupil/iris/retina detection, finger print detection, voice detection, and the like that maybe utilized to authenticate and authorize the individual to access and use the application 108.

As discussed above, the memory 138 of the external server 106 may store the application ID data 140. The application ID data 140 may include encrypted data that may pertain to user credentials including, but not limited to a passcode, pin, user name, and the like that may be utilized to authenticate and authorize the individual to access and use the vehicle connect application 108. The application ID data 140 may also include encrypted data that pertains to biometric identifiers that may be stored during the setup of the user access of the application 108.

In an exemplary embodiment, upon the individual attempting to access and use the vehicle connect application 108 through the vehicle 102 and/or the portable device 104, the individual may be prompted to enter the user credentials through the vehicle 102 and/or portable device 104 and/or allow the sensors of the portable device 104 to read biometric information (e.g., face scan, eye scan, finger print scan). Data provided based on the entering of user credentials and/or reading of biometric information may be communicated by the ECU 116 and/or the microprocessor 126 to the processor 136. The processor 136 may thereby compare the user credentials and/or biometric information to the encrypted data of the application ID data 140 to thereby determine if the individual is authenticated and authorized to access and use the vehicle connect application 108 through the vehicle 102 and/or the portable device 104. If the data provided based on the entering of user credentials and/or reading of biometric information may be received by the processor 136 and compared to the encrypted data of the application ID data 140, the individual may be determined to be a user 110 that may access and use the vehicle connect application 108.

If it is determined that the individual is not authenticated and authorized to access and use the vehicle connect application 108 (at block 310), the method 300 may proceed to block 314, wherein the method 300 may include determining that the plurality of layered authentication processes are not successfully completed. In an exemplary embodiment, if its determined that data provided by the individual entering user credentials and/or reading of biometric information do not match with the encrypted data of the application ID data 140, the processor 136 may thereby communicate respective data to the application authentication module 204. The application authentication module 204 may thereby determine that the application authentication process layer has not been successfully completed and may communicate respective data to the payment authorization module 210. In some embodiments, the device authentication module 202 may present a user interface through the display unit 130 of the portable device 104 and/or the display unit(s) of the vehicle 102 that includes a message explaining that access is denied to the payment wallet 112 based on the denial of the user authorization and authentication of the vehicle connect application 108 which lead to the unsuccessful completion of the application authentication process layer.

In one embodiment, the payment authorization module 210 may thereby determine that the plurality of layered authentication processes are not successfully completed based on the unsuccessful completion of the application authentication process layer. The payment authorization module 210 may accordingly prohibit access and use of the payment wallet 112. Access and usage of the payment wallet 112 of the vehicle connect application 108 may be prohibited until the module 210 determines that the plurality of layered authentication processes are successfully completed. Accordingly, the user 110 and/or another individual may not be allowed to access and use any of the interfaces of the payment wallet 112 through the vehicle 102 and/or the portable device 104 until the plurality of layered authentication processes are successfully completed.

If it is determined that the individual is authenticated and authorized to access and use the vehicle connect application 108 (at block 310), the method 300 may proceed to block 312, wherein the method 300 may include determining that the application authentication process layer has successfully completed. In an exemplary embodiment, if its determined that data provided by the individual entering user credentials and/or reading of biometric information matches with the encrypted data of the application ID data 140 and the individual accesses (e.g., logs in to) the vehicle connect application 108, the processor 136 may thereby communicate respective data to the application authentication module 204. The application authentication module 204 may thereby determine that the portable device authentication process layer has been successfully completed and may communicate respective data to the payment authorization module 210. With respect to the method 300, the payment authorization module 210 may thereby determine that the application device authentication process layer and the portable device authentication process layer of the plurality of layered authentication processes has been successfully completed (based on the determinations at block 306 and 312) and may thereby communicate with the vehicle authentication module 206 and the device connection authentication module 208 to determine if additional respective authentication processes have been successfully completed.

Figure 4:
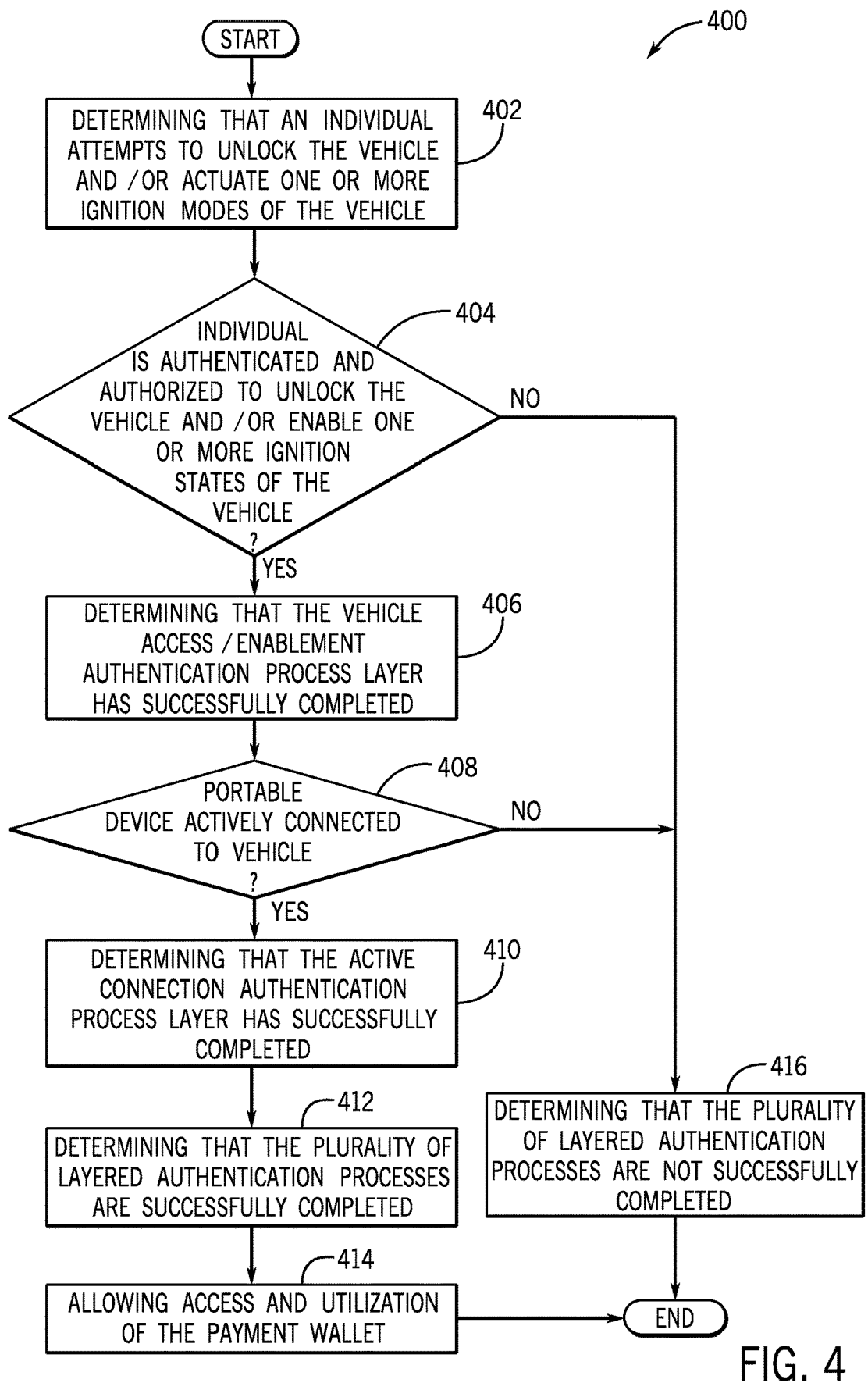
FIG. 4 is a process flow diagram of the method for determining a successful completion of a vehicle access/enablement authentication process layer and an active connection authentication process layer according to an exemplary embodiment of the present disclosure.

In one embodiment, upon determining the successful completion of the portable device authentication process layer and the application authentication process layer, the layered authentication system 114 may thereby proceed to execute the method 400. FIG. 4 is a process flow diagram of the method 400 for determining the successful completion of the vehicle access/enablement authentication process layer and the active connection authentication process layer according to an exemplary embodiment of the present disclosure. FIG. 4 will be described with reference to the components of FIG. 1 and FIG. 2, though it is to be appreciated that the method 400 of FIG. 4 may be used with additional and/or alternative system components. As discussed, the method 300 and method 400 includes the determination of the completion of each of the plurality of layered authentication processes in a particular order. However, it is to be appreciated that the layered authentication system 114 may determine the completion of each of the plurality of layered authentication processes in any contemplated order that may occur between ignition cycles of the vehicle 102 (e.g., after the vehicle 102 has been fully disabled).

The method 400 may begin at block 402, wherein the method 400 may include determining that an individual attempts to unlock the vehicle 102 and/or enable one or more ignition states of the vehicle 102. In one embodiment, if an individual (e.g., the user 110) utilizes one or more portable devices to input a door unlock input button to unlock a door of the vehicle 102, the communication unit 132 of the portable device 104 may be configured to transmit one or more respective communication signals to the communication unit 124 of the vehicle 102. The one or more communication signals may include data packet(s) that may include the device ID of the portable device 104 and/or the MAC address of the communication unit 132. The ECU 116 may be configured to thereby determine that the individual is attempting to unlock the vehicle 102.

In an alternate embodiment, the vehicle 102 may be equipped with walk-up/touch unlocking functionality. The ECU 116 may be configured to communicate with proximity sensors (not shown) or capacitive touch sensors (e.g., door handle sensors) to determine if an individual is within a close proximity of the door(s) of the vehicle 102 and/or has provided a touch input to unlock the door(s) of the vehicle 102. If it is determined that the individual is within the close proximity of the door(s) and/or has provided the touch input, the ECU 116 may be configured to thereby determine that the individual is attempting to unlock the vehicle 102. In one configuration, the ECU 116 may communicate with the communication unit 124 of the vehicle 102 to transmit one or more communication signals to the communication unit 132 of the portable device 104 which may prompt the communication unit 132 to transmit one or more communication response signals in response to the receipt of the one or more communication signals. The one or more communication response signals may include data packet(s) that may include the device ID of the portable device 104 and/or the MAC address of the communication unit 132. This functionality may allow the ECU 116 to ensure that the portable device 104 that is pre-configured to communicate with the vehicle 102 is found within a predetermined vicinity of the vehicle 102 to allow the door(s) of the vehicle 102 to be unlocked by the individual (carrying the portable device(s)).

In one embodiment, the vehicle 102 may be equipped with an ignition start button (not shown) and/or a key ignition start input (not shown) that may include push button actuator(s) (not shown) and/or capacitive sensor(s) (not shown) that may be utilized to determine if an individual enables one or more ignition states of the vehicle 102. The one or more ignition states if the vehicle 102 may include, but may not be limited to, a battery enablement state, an accessory enablement state, an engine enablement state, and the like.

Upon determining that an individual enables one or more ignition states of the vehicle 102, the push button actuator(s) and/or capacitive sensor(s) may send respective data to the ECU 116 of the vehicle 102. In one configuration, the ECU 116 may communicate with the communication unit 124 of the vehicle 102 to send one or more communication signals to the communication unit 132 of the portable device 104 which may prompt the communication unit 132 to transmit one or more communication response signals in response to the receipt of the one or more communication signals. The one or more communication signals may include data packet(s) that may include the device ID of the portable device 104 and/or the MAC address of the communication unit 132. This functionality may allow the ECU 116 to ensure that the portable device 104 that is pre-configured to communicate with the vehicle 102 is found within the vehicle 102 to allow the ignition state(s) to be enabled by the individual (carrying the portable device(s)).

The method 400 may proceed to block 404, wherein the method 400 may include determining if the individual is authenticated and authorized to unlock the vehicle 102 and/or enable one or more ignition states of the vehicle 102. In one embodiment, upon the communication unit 124 of the vehicle 102 receiving the communication signals (e.g., command signals, communication response signals) that are transmitted by the communication unit 132 of the portable device 104, the communication unit 124 of the vehicle 102 may access the storage unit 118 to analyze the portable device list 120 to determine if the device ID and/or MAC address included within the command signal(s) and/or the communication response signal(s) is included within the portable device list 120 to thereby determine if the portable device 104 may be pre-configured to be associated with and/or to communicate with the vehicle 102. The communication unit 124 may thereby determine if the device ID and/or MAC address included within the communication signals transmitted by the communication unit 132 of the portable device 104 are included within the portable device list 120 to thereby determine if the individual is authenticated and authorized to unlock the vehicle 102 and/or enable one or more ignition states of the vehicle 102. If it is determined that the device ID and/or the MAC address are included within the portable device list 120, the individual may be determined to be a user 110 that may unlock one or more doors of the vehicle 102 and enable one or more ignition states of the vehicle 102.

If it is determined that the individual is not authenticated and authorized to unlock the vehicle 102 and/or enable one or more ignition states of the vehicle 102 (at block 404), the method 400 may proceed to block 416, wherein the method 400 may include determining that the plurality of layered authentication processes are not successfully completed. In an exemplary embodiment, if its determined that the portable device 104 that is pre-configured to be associated with the vehicle 102 is not within a predetermined proximity of the vehicle 102 based on not finding a match between the device ID and/or MAC address of communication signals with the portable device list 120 (discussed above at block 402), the ECU 116 may thereby communicate respective data to the vehicle authentication module 206.

The vehicle authentication module 206 may thereby determine that the vehicle access/enablement authentication process layer has not been successfully completed and may communicate respective data to the payment authorization module 210. In some embodiments, the vehicle authentication module 206 may present a user interface through the display unit 130 of the portable device 104 and/or the display unit(s) of the vehicle 102 that includes a message explaining that access is denied to the payment wallet 112 based on the denial of the individual's authorization and authentication to unlock the vehicle 102 and/or enable one or more ignition states of the vehicle 102 which lead to the unsuccessful completion of the vehicle access/enablement authentication process layer. In other words, since the individual is not able to unlock the door(s) of the vehicle 102 and/or not able to enable one or more of the ignition states of the vehicle 102, the payment authorization module 210 may prohibit the payment wallet 112 from being accessed and used and may thereby present the user interface message explaining that access is denied to the payment wallet 112.

In one embodiment, the payment authorization module 210 may thereby determine that the plurality of layered authentication processes are not successfully completed based on the unsuccessful completion of the vehicle access/enablement authentication process layer. The payment authorization module 210 may accordingly prohibit access and use of the payment wallet 112. Access and usage of the payment wallet 112 of the vehicle connect application 108 may be prohibited until the module 210 determines that the plurality of layered authentication processes are successfully completed.

If it is determined that the individual is authenticated and authorized to unlock the vehicle and/or enable one or more ignition states of the vehicle 102 (at block 404), the method 400 may proceed to block 406, wherein the method 400 may include determining that the vehicle access/enablement authentication process layer has successfully completed. As discussed above, upon determining that the individual is attempting to unlock the door(s) of the vehicle 102 and/or enable one or more of the ignition states of the vehicle 102, the communication unit 124 of the vehicle 102 may access the storage unit 118 to analyze the portable device list 120 to determine if the device ID and/or MAC address included within the command signal(s) is included within the portable device list 120 to thereby determine if the portable device 104 may be pre-configured to be associated with and to communicate with the vehicle 102 and/or previously paired to the vehicle 102.

If it is determined that the device ID and/or MAC address included within the command signal(s) are included within the portable device list 120, the communication unit 124 may communicate respective data to the ECU 116 and the ECU 116 may operably control one or more locks of the vehicle 102 to be unlocked based on the individual's input. Additionally, the ECU 116 may enable one or more ignition states of the vehicle 102 based on the input provided. In other words, the individual may be determined to be a user 110 unlocks one or more doors of the vehicle 102 and/or enables one or more ignition states of the vehicle 102.

In one embodiment, upon operably controlling one or more locks of the vehicle 102 to be unlocked and/or enabling one or more ignition states of the vehicle 102, the ECU 116 may thereby communicate respective data to the vehicle authentication module 206. The vehicle authentication module 206 may thereby determine that the vehicle access/enablement authentication process layer has been successfully completed and may communicate respective data to the payment authorization module 210. The payment authorization module 210 may thereby determine that the vehicle access/enablement authentication process layer of the plurality of layered authentication processes has been successfully completed.

The method 400 may proceed to block 408, wherein the method 400 may include determining if the portable device 104 is actively connected to the vehicle 102. In one embodiment, the communication unit 124 of the vehicle 102 may be configured to pair the portable device 104 to the vehicle 102. Based on the pairing of the portable device 104 to the vehicle 102, the vehicle 102 may be able to identify and authorize the portable device 104 to initiate one or more types of active communication connections (e.g., Bluetooth, Wi-Fi, etc.) and supported functions (e.g., Bluetooth in-vehicle calling, in-vehicle application interface presentation, in-vehicle phone book presentation, in-vehicle audio connection, etc). Accordingly, each time one or more of the ignition states of the vehicle 102 are enabled, the communication unit 124 may determine if an active connection between the portable device 104 may be enabled based on a wired connection and/or a wireless connection between the portable device 104 and the vehicle 102.

In one or more embodiments, once one or more of the ignition states of the vehicle 102 are enabled, the communication unit 124 may be configured to determine if the portable device 104 is connected through a wired connection (e.g., USB connection) of the vehicle 102. If it is determined that the portable device 104 is connected through the wired connection, the communication unit 124 may initiate an active wired connection with the portable device 104 and may communicate respective data to the ECU 116. The ECU 116 may thereby determine the portable device 104 is actively connected to the vehicle 102.

In one configuration, upon determining that one or more of the ignition states of the vehicle 102 are enabled, the ECU 116 may utilize the communication unit 124 to send one or more communication initiation signals to initiate computer communications with the portable device 104. Upon receipt of the one or more communication initiation signals, the communication unit 132 of the portable device 104 may be configured to transmit one or more communication response signals with data packet(s) that may include the device ID of the portable device 104 and/or the MAC address of the communication unit 132.

The communication unit 124 of the vehicle 102 may analyze the communication response signal(s) to determine if the device ID and/or MAC address included within the command signal(s) are included within the portable device list 120 to determine if the portable device 104 was previously paired with the vehicle 102. If it is determined that the device ID and/or MAC address are included within the portable device list 120, the communication unit 124 may initiate an active wireless connection with the portable device 104 and may communicate respective data to the ECU 116. The ECU 116 may thereby determine the portable device 104 is actively connected to the vehicle 102.

Alternatively, if the communication unit 124 does not communicate data to the ECU 116 pertaining to the active wired connection and/or the active wireless connection, the ECU 116 may not determine that the portable device 104 is actively connected to the vehicle 102 (at block 408), the method 400 may proceed to block 416, wherein the method 400 may include determining that the plurality of layered authentication processes are not successfully completed. In an exemplary embodiment, if its determined that the portable device 104 is not actively connected to the vehicle 102 based on not determining a wired connection and/or not finding a match between the device ID and/or MAC address of communication signals with the portable device list 120 (discussed above at block 408), the ECU 116 may thereby communicate respective data to the device connection authentication module 208.

The device connection authentication module 208 may consequently determine that the active connection authentication process layer has not been successfully completed and may communicate respective data to the payment authorization module 210. In some embodiments, the device connection authentication module 208 may present a user interface through the display unit 130 of the portable device 104 and/or the display unit(s) of the vehicle 102 that includes a message explaining that access is denied to the payment wallet 112 as no active connection between the portable device 104 and the vehicle 102 has been determined which lead to the unsuccessful completion of the active connection authentication process layer. In other words, since an active computer connection has not been completed between the vehicle 102 and the portable device 104, the payment authorization module 210 may prohibit the payment wallet 112 from being accessed and used and may thereby present the user interface message explaining that access is denied to the payment wallet 112.

In one embodiment, the payment authorization module 210 may thereby determine that the plurality of layered authentication processes are not successfully completed based on the unsuccessful completion of the active connection authentication process layer. The payment authorization module 210 may accordingly prohibit access and use of the payment wallet 112. Access and usage of the payment wallet 112 of the vehicle connect application 108 may be prohibited until the module 210 determines that the plurality of layered authentication processes are successfully completed.

If it is determined that the portable device 104 is actively connected to the vehicle 102 (at block 408), the method 400 may include determining that the active connection authentication process layer has successfully completed. If the ECU 116 determines that the active connection between the portable device 104 and the vehicle 102 is completed based on the determination of the active wired connection and/or active wireless connection by the communication unit 124 of the vehicle 102, the ECU 116 may thereby communicate respective data to the device connection authentication module 208. The device connection authentication module 208 may thereby determine that the active connection authentication process layer has been successfully completed and may communicate respective data to the payment authorization module 210.

The method 400 may proceed to block 412, wherein the method 400 may include determining that the plurality of layered authentication processes are successfully completed. In one embodiment, the payment authorization module 210 may determine that the portable device authentication process layer, the application authentication process layer, the vehicle access/enablement authentication process layer, and the active connection authentication process layer have been completed based on respective communications received from the modules 202-208, as discussed above. Accordingly, the payment authorization module 210 may thereby determine that the plurality of layered authentication processes are successfully completed.

The method 400 may proceed to block 414, wherein the method 400 may include allowing access and utilization of the payment wallet 112. In an exemplary embodiment, upon determining that the plurality of layered authentication processes are successfully completed, the payment authorization module 210 may determine if the user 110 attempts to utilize the payment wallet 112 to make one or more in-vehicle payments through the vehicle 102 and/or the portable device 104. In particular, if the user 110 attempts to utilize the payment wallet 112 to make one or more in-vehicle payments through the vehicle 102 and/or the portable device 104, the ECU 116 and/or the microprocessor 126 may send respective data to the payment authorization module 210.

Based on the determination that the plurality of layered authentication processes are successfully completed, the payment authorization module 210 may execute one or more application executable data files associated with the payment wallet 112 to allow the user 110 to access and use one or more interfaces of the payment wallet 112. The one or more interfaces of the payment wallet 112 may be presented through the display unit(s) of the vehicle 102 and/or through the display unit 130 of the portable device 104. The user 110 may thereby utilize the payment wallet 112 to make one or more in-vehicle purchases to one or more vendors using one or more linked accounts.

In one embodiment, the payment authorization module 210 may maintain the authorized trust provided to the user 110s to access and use the payment wallet 112 as long as one or more ignition modes of the vehicle 102 are enabled. In other words, the user 110 may be able to access and use the payment wallet 112 to complete one or more in-vehicle payments until the ignition modes of the vehicle 102 are disabled (e.g., the vehicle 102 is turned off). In particular, the ECU 116 may communicate with the payment authorization module 210 when the user 110 disables the ignition modes of the vehicle 102 and the vehicle 102 is fully disabled. The payment authorization module 210 may thereby disable the payment wallet 112 and end the authorized trust provided to the user 110 thereby disallowing it from being used. The layered authentication system 114 may further determine if the plurality of layered authentication processes have been completed at a subsequent point(s) in time to (re)allow the user 110 to access and use the payment wallet 112 to complete in-vehicle secure payments through the portable device 104 and/or the vehicle 102.

Figure 5:
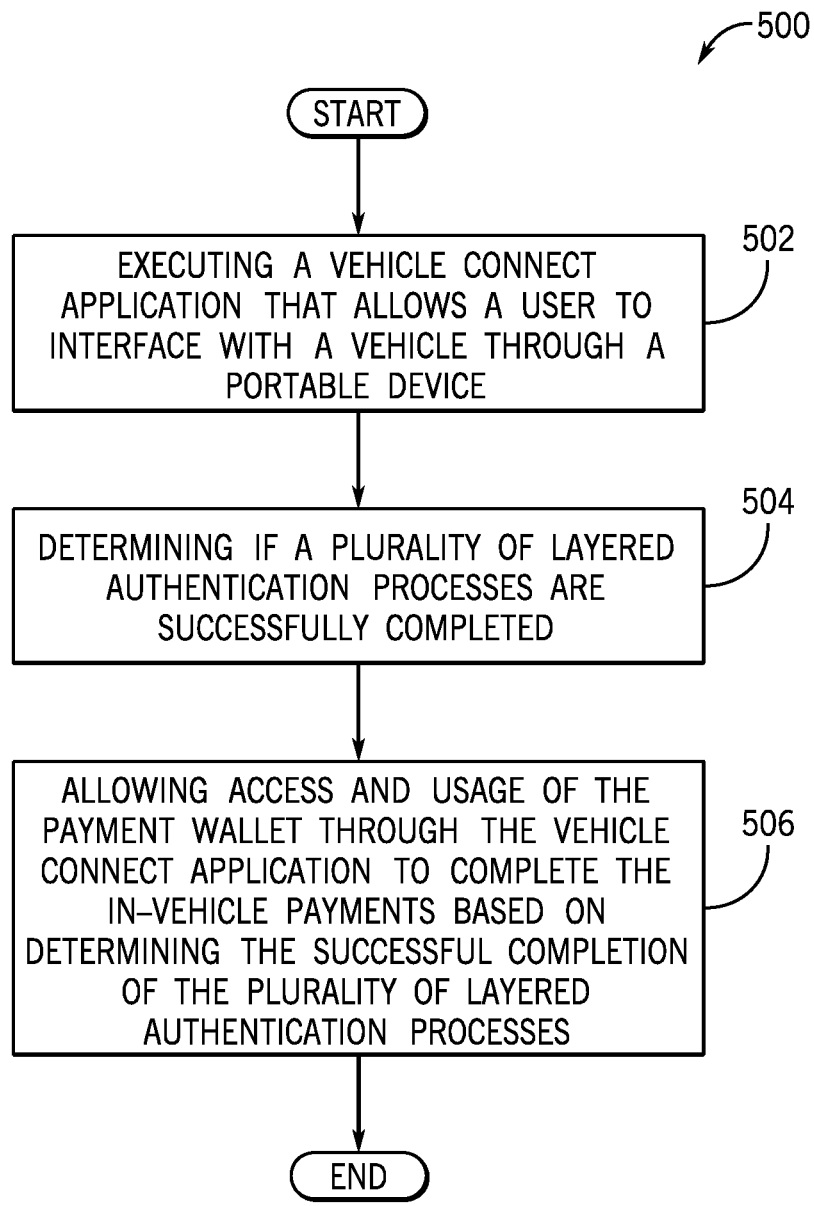
FIG. 5 is a process flow diagram of a method for layered authorization to manage the payment wallet for in-vehicle payments according to an exemplary embodiment of the present disclosure.

FIG. 5 is a process flow diagram of a method 500 for layered authorization to manage a payment wallet for in-vehicle payments according to an exemplary embodiment of the present disclosure. FIG. 5 will be described with reference to the components of FIG. 1 and FIG. 2, though it is to be appreciated that the method 500 of FIG. 5 may be used with additional and/or alternative system components. The method 500 may begin at block 502, wherein the method 500 may include executing a vehicle connect application 108 that allows a user 110 to interface with a vehicle 102 through a portable device 104. In one embodiment, the vehicle connect application 108 includes the payment wallet 112 that is configured to be used to provide in-vehicle payments.

The method 500 may proceed to block 504, wherein the method 500 may include determining if a plurality of layered authentication processes are successfully completed. The method 500 may proceed to block 506, wherein the method 500 may include allowing access and usage of the payment wallet through the vehicle connect application to complete an in-vehicle payment based on determining the successful completion of the plurality of layered authentication processes.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for layered authorization to manage a payment wallet for in-vehicle payments, comprising:

electronically executing at least one application executable data file to execute a vehicle connect application through at least one computing system, wherein the vehicle connect application is a computer executable software application that allows a user to electronically interface with a vehicle through a portable device, wherein the vehicle connect application includes the payment wallet as a virtual wallet that is linked to at least one payment account and that is configured to be used to provide in-vehicle electronic payments;

determining if a plurality of layered authentication processes are successfully completed based on receipt and electronic analysis of electronic communication signals from electronic components of the vehicle and electronic components of the portable device; and electronically enabling an authorized trust provided to the user to provide a graphical user interface that is presented upon a head unit of the vehicle that is configured to execute application interfaces for electronic access and usage of the payment wallet through the vehicle connect application to complete the in-vehicle electronic payments through the at least one payment account linked to the payment wallet based on determining the successful completion of the plurality of layered authentication processes.

2. The computer-implemented method of claim 1, wherein the vehicle connect application provides the user of the vehicle and the portable device with access to at least one: a feature, a function, and a service of the vehicle.

3. The computer-implemented method of claim 1, wherein the payment wallet includes at least one interface that allows the user to provide the in-vehicle payments from the at least one payment account through at least one of: the portable device and the vehicle.

4. The computer-implemented method of claim 1, wherein determining if the plurality of layered authentication processes are successfully completed includes determining if a portable device authentication process layer is successfully completed based on successfully authenticating and authorizing the user to unlock and use the portable device.

5. The computer-implemented method of claim 4, wherein determining if the plurality of layered authentication processes are successfully completed includes determining if an application authentication process layer is successfully completed based on authenticating and authorizing the user to access and use the vehicle connect application.

6. The computer-implemented method of claim 5, wherein determining if the plurality of layered authentication processes are successfully completed includes determining if a vehicle access/enablement authentication process layer is successfully completed based on the user's unlocking of at least one door of the vehicle and enablement of at least one ignition state of the vehicle.

7. The computer-implemented method of claim 6, wherein determining if the plurality of layered authentication processes are successfully completed includes determining if an active connection authentication process layer is successfully completed based on a successful completion of an active wired or wireless computer connection between the vehicle and the portable device.

8. The computer-implemented method of claim 7, wherein electronically enabling an authorized trust includes determining that the portable device authentication process layer, the application authentication process layer, the vehicle access/enablement authentication process layer, and the active connection authentication process layer have all been successfully completed and executing the at least one application executable data file associated with the payment wallet to allow the user to access and use at least one interface of the payment wallet.

9. The computer-implemented method of claim 1, further including maintaining the authorized trust provided to the user to access and use the payment wallet to complete the in-vehicle electronic payments through the at least one payment account linked to the payment wallet during a point in time at which at least one ignition mode of the vehicle is enabled, wherein the authorized trust ends and the payment wallet is disabled when the vehicle is disabled.

10. A system for layered authorization to manage a payment wallet for in-vehicle payments, comprising:

a memory storing instructions when executed by a processor cause the processor to:

electronically execute at least one application executable data file to execute a vehicle connect application through at least one computing system, wherein the vehicle connect application is a computer executable software application that allows a user to electronically interface with a vehicle through a portable device, wherein the vehicle connect application includes the payment wallet as a virtual wallet that is linked to at least one payment account and that is configured to be used to provide in-vehicle payments;

determine if a plurality of layered authentication processes are successfully completed based on receipt and electronic analysis of electronic communication signals from electronic components of the vehicle and electronic components of the portable device; and electronically enable an authorized trust provided to the user to provide a graphical user interface that is presented upon a head unit of the vehicle that is configured to execute application interfaces for electronic access and usage of the payment wallet through the vehicle connect application to complete the in-vehicle electronic payments through the at least one payment account linked to the payment wallet based on determining the successful completion of the plurality of layered authentication processes.

11. The system of claim 10, wherein the vehicle connect application provides the user of the vehicle and the portable device with access to at least one: a feature, a function, and a service of the vehicle.

12. The system of claim 10, wherein the payment wallet includes at least one interface that allows the user to provide the in-vehicle payments from the at least one payment account through at least one of: the portable device and the vehicle.

13. The system of claim 10, wherein determining if the plurality of layered authentication processes are successfully completed includes determining if a portable device authentication process layer is successfully completed based on successfully authenticating and authorizing the user to unlock and use the portable device.

14. The system of claim 13, wherein determining if the plurality of layered authentication processes are successfully completed includes determining if an application authentication process layer is successfully completed based on authenticating and authorizing the user to access and use the vehicle connect application.

15. The system of claim 14, wherein determining if the plurality of layered authentication processes are successfully completed includes determining if a vehicle access/enablement authentication process layer is successfully completed based on the user's unlocking of at least one door of the vehicle and enablement of at least one ignition state of the vehicle.

16. The system of claim 15, wherein determining if the plurality of layered authentication processes are successfully completed includes determining if an active connection authentication process layer is successfully completed based on a successful completion of an active wired or wireless computer connection between the vehicle and the portable device.

17. The system of claim 16, wherein electronically enabling an authorized trust includes determining that the portable device authentication process layer, the application authentication process layer, the vehicle access/enablement authentication process layer, and the active connection authentication process layer have all been successfully completed and executing the at least one application executable data file associated with the payment wallet to allow the user to access and use at least one interface of the payment wallet.

18. The system of claim 10, further including maintaining the authorized trust provided to the user to access and use the payment wallet to complete the in-vehicle electronic payments through the at least one payment account linked to the payment wallet during a point in time at which at least one ignition mode of the vehicle is enabled, wherein the authorized trust ends and the payment wallet is disabled when the vehicle is disabled.

19. A non-transitory computer readable storage medium storing instructions that when executed by a computer, which includes a processor perform a method, the method comprising:

electronically executing at least one application executable data file to execute a vehicle connect application through at least one computing system, wherein the vehicle connect application is a computer executable software application that allows a user to electronically interface with a vehicle through a portable device, wherein the vehicle connect application includes a payment wallet as a virtual wallet that is linked to at least one payment account and that is configured to be used to provide in-vehicle electronic payments;

determining if a plurality of layered authentication processes are successfully completed based on receipt and electronic analysis of electronic communication signals from electronic components of the vehicle and electronic components of the portable device; and electronically enabling an authorized trust provided to the user to provide a graphical user interface that is presented upon a head unit of the vehicle that is configured to execute application interfaces for electronic access and usage of the payment wallet through the vehicle connect application to complete the in-vehicle electronic payments through the at least one payment account linked to the payment wallet based on determining the successful completion of the plurality of layered authentication processes.

20. The non-transitory computer readable storage medium of claim 19, wherein the payment wallet includes at least one interface that allows the user to provide the in-vehicle payments from the at least one payment account through at least one of: the portable device and the vehicle.

* * * * *